R. H. HARRIS.
ROLL FOR LEATHER WORKING MACHINES.
APPLICATION FILED JUNE 15, 1910.

1,041,074.

Patented Oct. 15, 1912.

Witnesses.
C. H. Gannett.
J. Murphy

Inventor.
Robert H. Harris
by Jas. H. Churchill
atty.

COLUMBIA PLANOGRAPH CO., WASHINGTON, D. C.

UNITED STATES PATENT OFFICE.

ROBERT H. HARRIS, OF BOSTON, MASSACHUSETTS, ASSIGNOR TO THE TURNER TANNING MACHINERY COMPANY, OF PEABODY, MASSACHUSETTS, A CORPORATION OF MAINE.

ROLL FOR LEATHER-WORKING MACHINES.

1,041,074.  Specification of Letters Patent.  Patented Oct. 15, 1912.

Application filed June 15, 1910. Serial No. 566,915.

*To all whom it may concern:*

Be it known that I, ROBERT H. HARRIS, a citizen of the United States, residing in Boston, county of Suffolk, and State of Massachusetts, have invented an Improvement in Rolls for Leather-Working Machines, of which the following description, in connection with the accompanying drawings, is a specification, like letters on the drawings representing like parts.

This invention relates to a working roll for use on machines for treating hides, skins and leather, and more particularly to a feed roll for machines for fleshing hides and skins.

The invention has for its object to provide a roll of the character described, of increased gripping efficiency, whereby wet or slimy hides or skins may be more effectively held from slipping with a minimum pressure, which enables the wet or slimy hide or skin to be fed out of the machine in the desired or proper manner, and also enables the machine to be operated with minimum power. For this purpose, the roll is provided on its circumferential surface which makes contact with the hide or skin with a substantially large number of sockets, cups or recesses, which are closed at their sides and bottom to form suction cups or wells, which serve to suck the portion of hide or skin which closes them into the same so as to obtain a firm suction grip upon a wet or slimy hide or skin at a substantially large number of individual points, which aggregate to firmly hold the hide or skin and prevent movement thereof independently of the roll.

The suction cups or wells may be made in the circumferential surface of a rubber or other yielding covering of a metallic or non-metallic roll.

Figure 1:
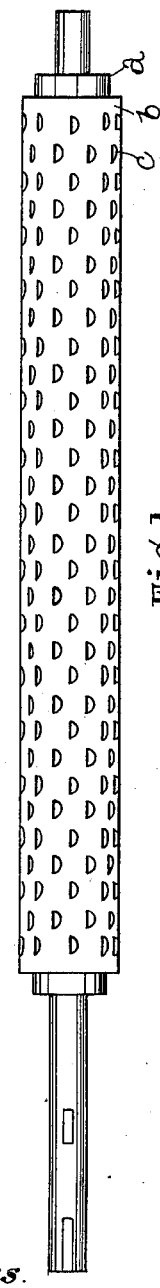
Figure 2:
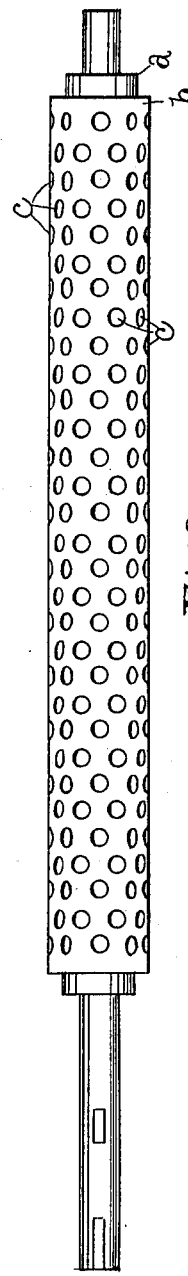
Figure 4:
Figure 3:

Figure 1 represents in plan a roll embodying this invention. Fig. 2, a modification to be referred to. Fig. 3, a section of the roll shown in Fig. 1. Fig. 4, a section of the roll shown in Fig. 2, and Fig. 5, a modification in section to be referred to.

Referring to Figs. 1 to 4, $a$ represents the center or shaft of a roll provided with a sleeve or covering $b$ of rubber or other yielding material, which is provided on its outer circumference with a plurality of sockets, cups or recesses $c$, which are distributed about the roll in substantially close proximity to one another. The cups or wells $c$ may be semi-circular in shape as represented in Fig. 1 or circular in shape as represented in Fig. 2, or of other shape, and they may extend entirely through the rubber covering $b$ or but partially therethrough as represented herein. It will thus be observed, that the wells or cups $c$ are closed at their bottoms and sides and are only open at their mouths for the passage of air into the same, and as a result, when pressure is applied to the external surface of the rubber sleeve or covering $b$, the latter will yield and the side walls of the wells will be compressed and a part of the air expelled by the hide or skin covering the mouths of said wells, so that a partial vacuum will be formed in those wells which are covered by the hide or skin and especially by the latter in a wet or slimy state. The partial vacuum thus formed tends to suck the hide or skin into the wells or cups and thereby causes the hide or skin to adhere firmly to the roll at the point where pressure is applied, which is usually effected by passing the hide between the feed roll and a bed roll or other support common to machines of the class referred to. In this manner, the hide or skin and especially a wet or slimy hide or skin is firmly held from movement independently of the roll and is thus maintained in its proper or desired position with relation to the bladed cylinder or other operating tool employed in machines of the class referred to.

Figure 5:
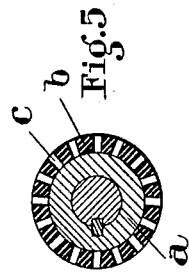

In Fig. 5, the invention is shown in a feed roll in which the cups or wells $c$ extend entirely through the yielding covering $b$. The feed roll herein shown avoids the necessity of using a severe pressure upon the feed roll to cause it to grip the hide or skin, and enables the hide or skin and especially a wet or slimy hide or skin to be fed out of the machine in which it is used with a minimum power. So also it avoids or reduces to a minimum the marking of the hide or skin by the fluted rolls now commonly employed.

Claim—

A roll of the character described for leather working machines, comprising a center shaft of rigid material of a length materially in excess of its diameter, and a covering or sleeve of rubber capable of yielding under pressure, said covering having distributed over its surface in substantially close proximity to one another a plurality of cups or wells which are closed at their bottoms and sides, and whose mouths are open at the outer circumference of the sleeve to be closed by contact with the work, substantially as described.

In testimony whereof, I have signed my name to this specification in the presence of two subscribing witnesses.

ROBERT H. HARRIS.

Witnesses:
JOHN E. FITZ GERALD, Jr.,
P. D. BROWN.